Sept. 25, 1951     H. S. BRIGHAM     2,568,944
RETRIEVABLE BRIDGE PLUG
Filed April 25, 1949
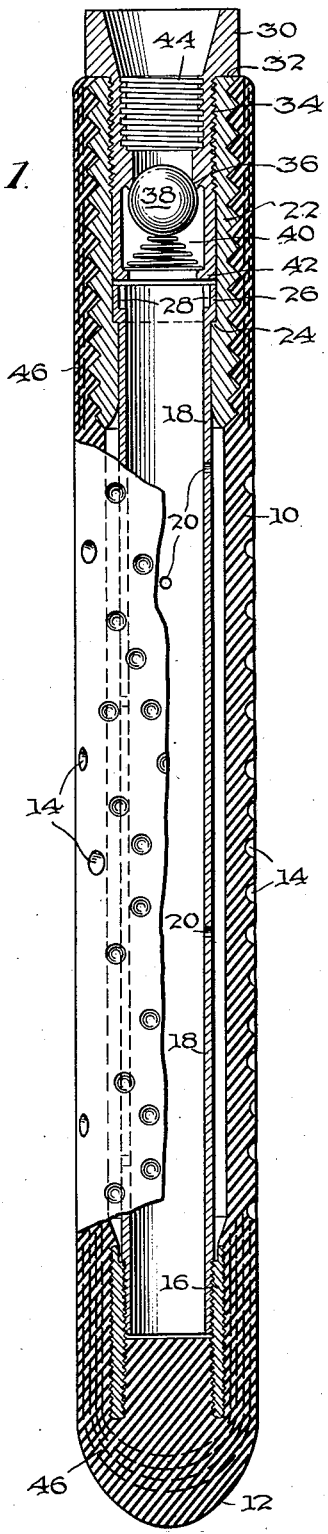
INVENTOR.
HARRY S. BRIGHAM Patented Sept. 25, 1951

2,568,944

UNITED STATES PATENT OFFICE 2,568,944

RETRIEVABLE BRIDGE PLUG

Harry S. Brigham, Bakersfield, Calif., assignor to Western Gulf Oil Company, Los Angeles, Calif., a corporation of Delaware Application April 25, 1949, Serial No. 89,527

3 Claims. (Cl. 166—13)

This invention relates to bridge plugs, such as are used for plugging a well casing, a conduit or any hole in the ground.

It is an object of the invention to provide such a plug that may readily be inserted in a conduit or the like in a desired position, where it will be firmly retained in place until such time as it is desired to remove the plug.

A further object of the invention is to provide a plug of the above type which may readily be removed from its installed position without requiring drilling operations or the like.

Still another object of the invention is to provide such a plug which is expanded in place to secure the same within a hole, a conduit or the like by means of fluid pressure produced within said plug, together with provision for retaining the expanded plug in its distended position after removal of the setting pipe. An additional object of the invention is to provide a device of the kind just described and so arranged that the connection of a retrieving tool thereto will automatically open said valve, allowing the expanded plug to return to its normal contracted condition for ready removal from the hole or conduit. A further object of the invention is to provide a device of this type whose operation is not dependent upon the existence of a body of pressure fluid within the conduit being plugged, so that it may be firmly retained in place regardless of the existence of such a pressure fluid within the plugged conduit.

Still another object of the invention is to provide a plug of the above type which while normally utilized as a retrievable plug, may readily be filled with cement, plastic or equivalent hard substance to form a permanent plug in the conduit.

Additional objects of the invention are to provide a structure of the above type which is simple and economical to manufacture, and whose use in the field is free from complications.

The above and other objects and advantages of the invention will best be understood from the following detailed specification of a preferred embodiment thereof, taken in connection with the appended drawings, in which:

Fig. 1 is a vertical sectional view through a preferred form of bridge plug, a portion thereof being shown in elevation, and Fig. 2 is a vertical sectional view of a preferred form of plug setting and venting tool for use with the plug of Fig. 1.

In many operations, and particularly in connection with well drilling and the like, it is occasionally necessary to be able to bridge or plug a pipe, tubular conduit or even a hole in the ground at some predetermined point. It is common practice to establish such a bridge or plug by placing a body of cement or the like at the desired point in the conduit or hole, and allowing the same to harden in place. When it becomes necessary to remove such a plug however, a time consuming and expensive drilling operation is required, which is particularly objectionable where it is necessary to bridge the conduit or well casing at successive points from time to time as in testing operations familiar to those versed in the oil well art. It has often been proposed to provide a temporary bridge or plug which could be set firmly in place but readily removed when occasion required, but such devices have gained no great favor because of inherent limitations and complications attending their use, such as the requirement for an external anchor or the like.

I have found that a very simple and efficient retrievable bridge plug may be formed as an expansible sheath of rubber or the like which is provided with a fluid pressure connection for the introduction of a pressure fluid within said sheath and operated to distend the same and thereby to wedge it in place within a conduit, hole or the like, together with a check valve which will operate to retain the distending pressure fluid within said sheath after disconnection of the pipe or tube through which the fluid was introduced after placement of the plug in its desired position. A preferred construction embodying the above principles is illustrated in detail in Fig. 1 of the drawings, in which numeral 10 designates an elongate imperforate tubular sheath of rubber or equivalent tough, distensible material closed at its lower end 12. The outer surface of member 10 may be provided with reentrant dimples 14 to increase by vacuum action the holding force when the device is expanded into contact with the walls of a pipe, conduit or the like.

A metallic bushing 16 is securely held within the lower end of member 10 as by having its outer surface serrated or threaded and vulcanized to the body of rubber adjacent the closed end 12, the inner surface of said bushing 16 being screw threaded to receive the threaded extremity of a rigid mandrel 18 extending lengthwise of the sheath 10 and provided with apertures 20 for the passage of pressure fluid (liquid or gaseous) introduced via the open upper end of said mandrel, whereby to expand or distend the sheath 10 to form the desired plug.

The open upper end of sheath 10 has secured therein a metallic collar 22 whose outer surface is preferably serrated and vulcanized to the surrounding body of the sheath, and this collar 22 is formed with a shoulder 24 adapted to engage an enlarged portion 26 of mandrel 18 when the latter is turned into threaded engagement with the bushing 16. The operation of screwing mandrel 18 into place is facilitated by the provision of spanner slots 28 or the like in its upper end, for engagement by a suitable tool in a well known manner. It will be observed that the firm engagement of mandrel 18 with bushing 16 and collar 22, both of which are fixedly and permanently secured to sheath 10 adjacent its ends, will prevent any substantial elongation of the sheath as a result of the build-up of pressure therein, whereby the entire effect of said pressure operates to expand the sheath radially for secure lodgement within a hole, conduit or the like.

To provide for the admission of a fluid pressure medium into the mandrel 18 and thence against the inner surface of sheath 10, there is provided a fluid conductive connector fitting 30 having a shoulder 32 brought into engagement with the outer face of collar 22 as by the action of screw threads 34 on corresponding portions of the collar and fitting. The bore of fitting 30 is formed with a valve seat 36 facing towards the interior of mandrel 18, and upon which seat normally rests a ball check valve element 38 biased toward said seat as by a pressure spring 40 secured within the bore of fitting 30 by a flange or a rolled-over portion 42.

Outwardly of check valve element 38, the bore of fitting 30 may be screw threaded as at 44 for the connection of a suitable setting and fluid pressure conveying tool to be described below in connection with Fig. 2 of the drawings. The material of sheath 10 may desirably be strengthened adjacent its opposite ends as by strips of fabric 46 imbedded therein and extending past the lateral surfaces of bushing 16 and collar 22. In order to enable the setting tool (to be described) to be secured and removed from the retrievable plug when the latter is in position in a conduit or the like, the threads 44 are preferably made left-hand, and hence opposite to threads 34, so that after the plug has been set in place and distended into wedging relation with the conduit, the setting tool may be removed by a right hand rotation thereof, which rotation will not tend to loosen the right hand threads 34 or other right hand threads connecting lengths of pipe or the like extending from the upper end of the setting tool to ground level or other remote point.

Referring now to Fig. 2 of the drawings, there is illustrated in longitudinal section a preferred form of setting tool, comprising a generally tubular member 48 having a suitably threaded or other connecting portion 50 at one end adapted to connect the same to a tool pipe or the like. The opposite end of member 48 is screw threaded as at 52 to correspond to the threads 44 of fitting 30, and is provided with an internal plug 54 which may have a reduced extremity 56 adapted to engage and depress check valve 38 against the pressure of spring 40 when the tool is threaded into full engagement with fitting 30.

Plug 54 is provided with a passageway 58 preferably located off the axis of the tubular member 48 and threads 52, whereby to provide a pressure fluid conductive passageway that will not be sealed by check valve ball 38 when the latter is engaged by portion 56 of the tool.

The operation of the device will be clear from the above description. In brief, the expansible plug of Fig. 1 is connected with the tool of Fig. 2 by threaded engagement of their corresponding threads 44 and 52, which operation incidentally forces check ball 38 downward into open position. By the use of suitable pipe lengths or the like connected to the tool as at 50, the expansible plug is lowered into the well casing, conduit or the like o a desired point, whereupon a suitable pressure luid is applied through the setting pipes and tubular member 48, passageway 58, mandrel 18 and apertures 20 against the interior of sheath 10, which is thereby distended to bring its outer surface into intimate engagement with the walls of the casing, conduit or the like. Since this frictional engagement will hold the entire plug assembly firmly against rotation, the setting pipes and tool 48 may readily be removed by right hand rotation thereof as from ground level, which will disengage left hand threads 52 and 44. As projection 56 recedes from check ball 38, the same is forced by spring 40 against seat 36, thereby to seal the interior of sheath 10 against loss of pressure fluid. After removal of tool 48, the internal pressure of fluid trapped within the sheath aids spring 40 in securing the valve element 38 in its closed position, and the expanded plug therefore remains in firm frictional engagement with the interior of the conduit.

To remove the expansible plug, all that is necessary is to thread tool 48 into connector 30 by a left hand rotation of the former whereupon projection 56 will depress ball 38 and permit the venting of pressure fluid within the sheath 10 outwardly via passageway 58, whereupon sheath 10 will collapse to its original dimensions and may be withdrawn by lifting the pipes or the like coupled to tool 48.

Ball 38 may desirably be formed of a plastic, rather than metal, in order to enable it to be drilled out in the event operational requirements dictate such a procedure. Where the plug is to be left permanently in place, a fluid cement, plastic or other hardenable substance may be utilized to distend the same, such substance retaining the distended shape of the plug until it becomes necessary to remove the latter by conventional operations such as drilling or breaking.

I have described in detail a preferred embodiment of the invention, but it is to be understood that numerous changes and alterations in the specific construction disclosed herein may be accomplished without departing from the spirit of the invention as defined in the appended claims.

I claim:

1. A bridge plug comprising an elongate, imperforate expansible sheath of rubber or the like having one end closed, a threaded bushing fixedly secured within said sheath adjacent its closed end, a shouldered and threaded collar fixedly secured within said sheath at its other end, a perforate tubular mandrel extending through said collar and provided with an enlarged end seated upon the shoulder of said collar, the other end of said mandrel threadedly engaging said bushing, and a combined connector fitting and check valve threadedly received within said collar outwardly of the enlarged end of said mandrel.

2. A bridge plug comprising an imperforate, expansible sheath of rubber or the like, a bushing within one end of said sheath and fixedly secured thereto, said bushing being closed at its end to prevent ingress and egress of fluid therethrough to the interior of said sheath, a collar fixedly secured within the opposite end of said sheath and formed internally with an inwardly projecting shoulder, a tubular, perforate mandrel attached to said bushing at one end and formed adjacent its other end with an enlarged portion defining a shoulder abutting the inwardly projecting shoulder of said collar, and a check valve mounted in said collar for admitting fluid under pressure to the said sheath to expand the same and to maintain it in expanded condition.

3. A bridge plug comprising an imperforate, expansible sheath of rubber or the like an internally threaded bushing within one end of said sheath and fixedly secured thereto, said bushing being closed at its end to prevent ingress and egress of fluid therethrough to the interior of said sheath, an elongated collar at the opposite end of said sheath, said collar extending into the sheath and having means on its exterior surface for gripping and securing the end of the sheath, the interior of said collar being formed with an inwardly extending shoulder, a tubular, perforate mandrel mounted longitudinally within said sheath, said mandrel being threaded at one end to engage the internal threads of said bushing and having an outwardly extending shoulder at its other end seating upon the internal shoulder of said collar, and check valve means secured in the said collar.

HARRY S. BRIGHAM.

REFERENCES CITED

The following references are of record in the file of this patent:

UNITED STATES PATENTS

| Number | Name | Date |
| --- | --- | --- |
| 2,092,041 | Armentrout | Sept. 7, 1937 |
| 2,196,658 | Burt | Apr. 9, 1940 |
| 2,231,282 | Norris | Feb. 11, 1941 |
| 2,299,734 | Betts | Oct. 27, 1942 |
| 2,399,544 | Danner | Apr. 30, 1946 |